July 16, 1963  W. M. HAWN ETAL  3,098,114
JUNCTION BOX FOR RECESSED WALL INSTALLATION
Filed May 12, 1959  2 Sheets-Sheet 2

Inventors
W. Myrton Hawn
David Chann
Robert J. Besal
Donald V. Vesely

By Hill, Sherman, Meroni, Gross & Simpson
Attys

United States Patent Office 3,098,114
Patented July 16, 1963

3,098,114
JUNCTION BOX FOR RECESSED WALL
INSTALLATION
Walter Myrton Hawn, Bridgeville, Pa., and David Chann, Forest Park, Robert J. Besal, Hinsdale, and Donald V. Vesely, Hillside, Ill., assignors to The Pyle-National Company, Chicago, Ill., a corporation of New Jersey
Filed May 12, 1959, Ser. No. 812,605
12 Claims. (Cl. 174—58)

This invention relates generally to electrical apparatus and more particularly relates to a junction box for recessed wall installation where a junction box is made in the size and configuration of a standard U.S. brick and has connected to the front thereof a face plate particularly characterized by means forming a wiring compartment and a plurality of spaced openings for carrying a cluster of light units, the rear end of the junction box having an entrance box attached thereto with knock-out openings formed on the top, bottom, side and rear walls for accommodating conduit runs in any direction.

It is an object of the present invention to provide electrical apparatus for accommodating a plurality of lighting units for permanent flush mounting on walls of brick, concrete block, brick and block combination, brick veneer or wood, sheet metal, asbestos, and any and all types of exterior surface material.

Another object of the present invention is to provide a cluster box lighting unit which can be installed during construction or in existing walls by simply removing one brick.

Yet another object of the present invention is to provide an improved junction box adapted for carrying a lighting unit cluster and which may be readily incorporated in new masonry construction, in existing masonry walls, or in frame or sheet structures.

Many other features, advantages and additional objects of the present invention will become manifest to those versed in the art upon making reference to the detailed description which follows and the accompanying sheets of drawings in which a preferred structural embodiment incorporating the principles of the present invention is shown by way of illustrative example.

Figure 1:
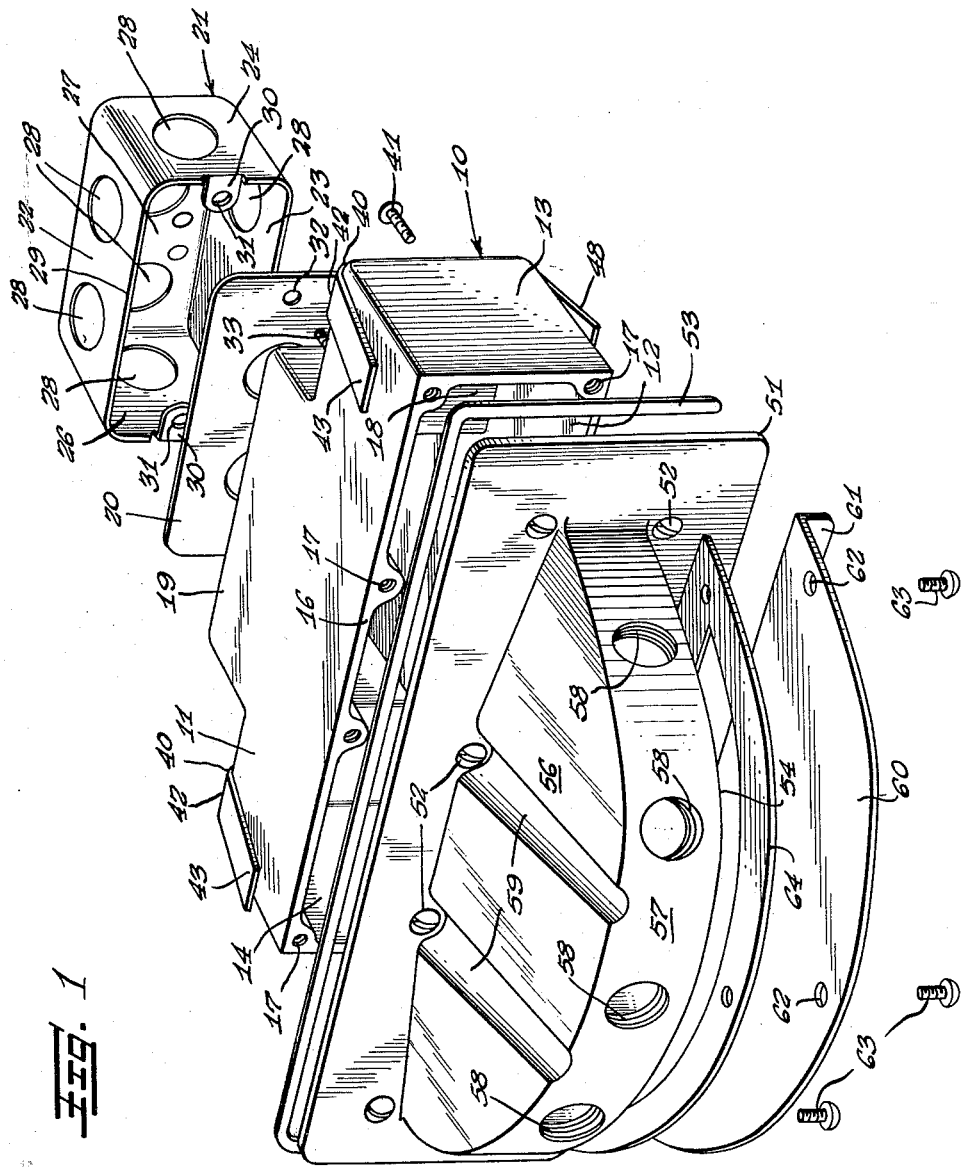
FIGURE 1 is an isometric exploded view of a structure incorporating the principles of our invention.

Although the present invention finds a particularly useful application to carrying a cluster of lighting units for permanent flush mounting on walls, it will be appreciated that the principles of the present invention are applicable wherever it is desirable to incorporate a junction box in a recessed installation.

A standard U.S. "brick" is understood to have definite prerequisites. For example, in Webster's Dictionary a "brick" is defined as "a building and paving material made by molding clay into blocks while moist and hardening them in the sun or by fire." A supplement definition then follows in Webster's Dictionary which reads as follows:

"An individual molded block of the above material, usually rectangular, in U.S. averaging 2¼ x 3¾ x 8 inches."

We have discovered, therefore, that highly advantageous results can be obtained by providing a junction box which is sized and shaped to correspond to a standard U.S. brick, thereby facilitating installation of the junction box during construction or in existing walls by simply removing one brick.

Referring particularly to the drawings, it will be noted that the junction box is indicated at 10 and comprises an upper wall 11, a lower wall 12, a first side wall 13, and a second side wall 14. The top, bottom and side walls 11–14, inclusive, are disposed to form a rectangular brick-shaped article corresponding in size and shape to a standard U.S. brick.

The junction box 10 is further provided with a flanged front opening 16 having a plurality of peripherally spaced threaded apertures 17.

The junction box 10 is further provided with a rear wall 18 which is particularly characterized by an intermediate rearwardly projecting portion shown at 19.

An appropriate rear opening in the projecting portion 19 is closed by a cover member 20 of a standard sized entrance box shown herein at 21.

The entrance box 21 comprises a top wall 22, a bottom wall 23, a first side wall 24, a second side wall 26 and a rear wall 27. Each of the top, bottom, side and rear walls 22–27, inclusive, constitute sheet form means having formed therein knock-out openings 28, thereby to receive a conduit run into the entrance box 21 from any direction.

The cover member 20 is common to the junction box 10 and to the entrance box 21 and in accordance with the usual construction of an entrance box unit, an open front side surrounded by a peripheral edge indicated at 29 has on opposite sides thereof inwardly projecting lugs 30 each apertured as at 31. The cover member 20 is also provided with corresponding apertures as at 32 and the junction box 10, the cover member 20 and the entrance box 21 may be placed in firm assembly with one another by appropriate fastening means indicated in FIGURE 1 at 33.

Figure 2:
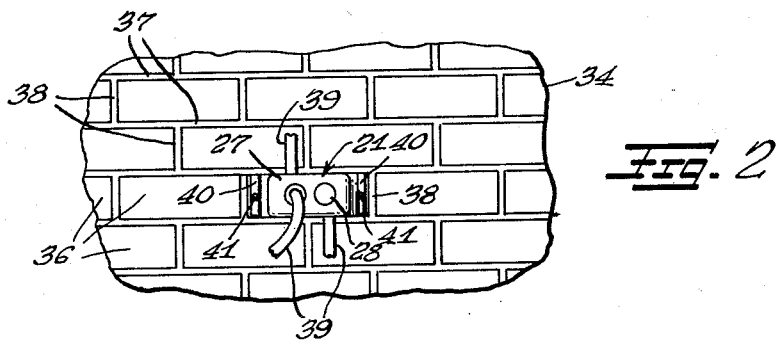
FIGURE 2 is a rear view of a wall construction provided in accordance with the principles of the present invention and having a single brick replaced by the junction box assembly of the present invention.

To illustrate the use of the application, there is shown in FIGURE 2 a wall 34 comprising a plurality of standard U.S. bricks, each indicated at 36. The bricks are bonded together in integral aligned assembly by horizontal layers of mortar indicated at 37 and by vertical layers of mortar indicated at 38. The entrance box 21 is shown projecting from the rear surface of the wall 34 and accommodates conduit runs leading into the entrance box from any direction, for example, the conduit runs shown at 39.

Figure 3:
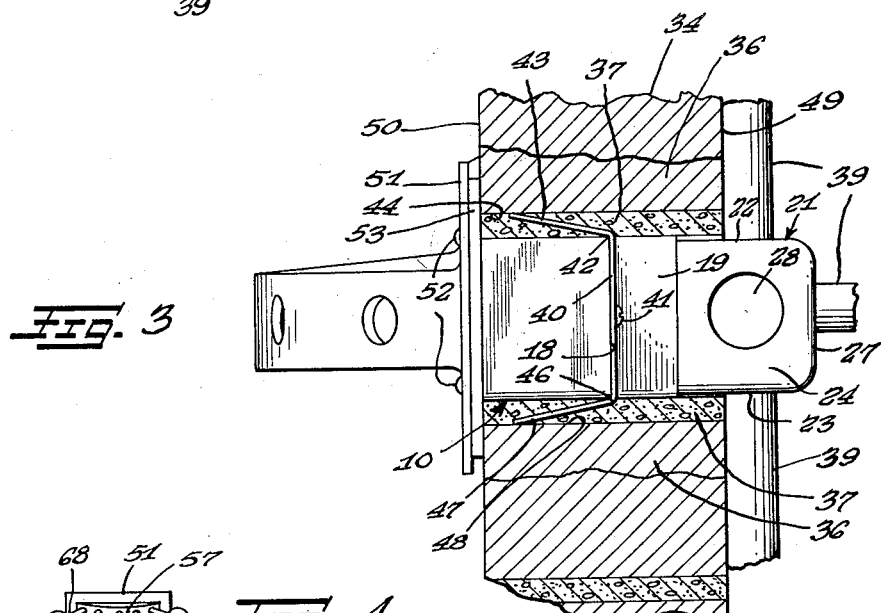
FIGURE 3 is a cross-sectional view through the wall of FIGURE 2 but showing in elevation the junction box of the present invention and particularly illustrating the method of mortaring and caulking the unit into a brick wall.

The method of mortaring and caulking the junction box 10 into the wall is particularly illustrated in FIGURE 3. As shown therein, either during construction or in existing walls, one brick 36 is simply removed and the junction box 10 is inserted by way of substitution. Since the junction box 10 corresponds in size and shape to a standard U.S. brick, it readily fits between the horizontal layers of mortar indicated at 37 as well as the vertical layers of mortar 38.

To further assist in properly supporting and centering the junction box 10, it will be noted that appropriate anchor straps may be provided on opposite sides of the projecting portion 19. Thus, as shown in particular detail in FIGURES 1 and 3, an anchor strap 40 is connected to the rear wall 18 of the junction box 10 by a fastener 41, there being two anchoring straps 40, one on each side of the projection 19.

Each anchor strap 40 has portions which extend over the rear wall 18 and towards the top and bottom walls 11 and 12 of the junction box 10. At the corner between the top wall 11 and the rear wall 18, the anchor strap 40 is offset as at 42 and the free end thereof extends in angularly offset relation in overlying adjacency to the top wall 11, as shown at 43. The free end of the anchor strap 40 may thus be spaced from the top wall 11 by a distance corresponding to the desired thickness of the layer of mortar 37 and will engage in adjoining surface 44 of an adjacent brick 36, thereby to assist in anchoring, supporting and centering the junction box 10. Likewise, the opposite end of the anchor strap 40 is offset as at 46 and a free end portion 47 extends in angularly disposed relation to the bottom wall 12 to space the free end 47 from the bottom wall 12 a distance corresponding to the thickness of the layer of mortar 37 and will engage an adjoining surface 48 of an adjacent brick 36.

When so mounted, the entrance box 21 projects rearwardly from a rear face 49 formed by the wall 34 and the flanged opening 16 of the junction box 10 will be positioned generally flush with the front face 50 formed by the wall 34, the front and rear faces 50 and 49 being spaced apart from one another in substantially parallel relation a distance corresponding to the thickness of the wall 34.

With the arrangement thus far described, it is particularly convenient to assemble to the junction box 10 additional components of the present invention which are particularly adapted to accommodate a plurality of lighting units for permanent flush mounting on the wall 34. Thus, there is provided a face plate 51 having a plurality of openings corresponding in number and placement to the threaded openings 17, thereby to accommodate a corresponding plurality of screws 52 by means of which the face plate 51 may be placed in firm assembly with the junction box 10 firmly assembled within the wall 34.

In order to provide a weatherproof seal between the face plate 51 and the wall 34, a caulking strip 53 is inserted between the sides and the top.

The face plate 51 is particularly characterized by the formation thereon of an integral boss 54 having a top wall 56 and an arcuate wall 57 having formed therein a plurality of spaced tapped openings 58.

The top wall 56 may be grooved as at 59 to accommodate tool manipulation of adjacent fastening screws 52 and such grooved portions may also serve to rigidify and strengthen the top wall 56 of the boss 54.

The boss 54 is hollow and thereby provides a roomy wiring compartment so that lighting units, for example, may be assembled to the tapped or threaded openings 58 and wiring connections completed. To facilitate access to the wiring compartment provided by the boss 54, the bottom wall thereof may be made removable. For example, as shown in FIGURE 1, the bottom wall of the boss 54 is shown formed by an access cover 60 flanged as at 61 and including a plurality of apertures 62 each receiving a fastening screw 63 adapted to be threaded into a tapped hole formed on the lower side of the boss 54. A sealing gasket 64 is interposed between the boss 54 and the access cover 60 to keep the wiring compartment formed by the boss 54 weather-tight.

Figure 4:
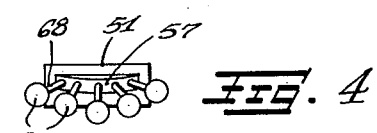
FIGURES 4, 5 and 6 are somewhat diagrammatic front views illustrating various cluster arrangements which can be utilized in accordance with the principles of the present invention.
Figure 5:
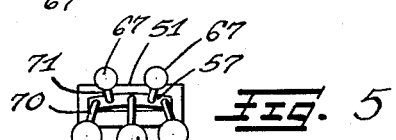
Figure 6:
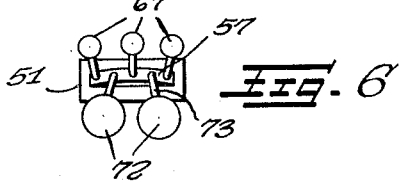

Exemplary cluster arrangements for commercially available lighting units are illustrated in FIGURES 4, 5 and 6. For example, in FIGURE 4 there is shown an annular row of similarly sized light units 67 each carried on a mounting member 68 threaded into a corresponding tapped opening 58 in the arcuate front wall 57, thereby to provide an arcuate cluster.

In the arrangement of FIGURE 5, a pair of light units of a size corresponding to the size indicated at 67 is alternated with a trio of light units indicated at 69, the light units 69 being carried on mounting means 70 and the light units 67 being carried on mounting means 71 so as to dispose the light units 67 and 69 in a cluster having vertical as well as transverse extent.

In the FIGURE 6 arrangement, the disposition is reversed, there being provided a trio of light units 67 alternately spaced with a pair of light units herein shown as a large sized light unit 72 each carried on a mounting means 73.

Although the apparatus thus far described is particularly useful for mounting in new masonry construction or in existing masonry walls, it is readily applicable to frame or sheet structures. If such is indicated, the wall is merely provided with a hole corresponding generally to the rectangular size of a standard U.S. brick and the face plate 51 may be provided with additional holes in each corner. The junction box 10 is assembled with the auxiliary cover member 20 and conduit 39 is attached. After lighting units have been fastened to the face plate 51, the face plate 51 is fastened to the junction box 10 and the assembly is secured to the wall by using appropriate fastening means such as bolts or screws. The access cover 60 may then be replaced and, if desired, caulking compound such as the caulking strip 53 may be applied around the face plate flange of the face plate 51.

Although minor modifications might be suggested by those versed in the art, it should be understood that we wish to embody within the scope of the patent warranted hereon all such modifications as reasonably and properly come within the scope of our contribution to the art.

We claim as our invention:

1. A cluster box having a face plate for accommodating plural light units in flush mounting on a masonry wall comprising, an entrance box having top, bottom, side and rear walls, and an open front side, each wall of said entrance box being formed with means forming knock-out openings adapted to receive a conduit run, a junction box having a dimensional size equal to a standard brick and having a rear wall connected in firm assembly with said entrance box at said open front side, said junction box having a flanged front opening adapted to be positioned in flush relationship to the surface of a wall into which said junction box may be mounted, a face plate closing said flanged front opening and having means forming a plurality of mounting openings, and a cluster of lighting units carried in said mounting openings of said face plate.

2. A cluster box having a face plate for accommodating plural light units in flush mounting on a masonry wall comprising, an entrance box having top, bottom, side and rear walls, and an open front side, each wall of said entrance box being formed with means providing knock-out openings adapted to receive a conduit run, a junction box having a dimensional size equal to a standard U.S. brick and having a rear wall in firm assembly with said entrance box at said open front side, said junction box having a flanged front opening adapted to be positioned in flush relationship to the surface of a wall into which said junction box may be mounted, said junction box having means forming anchor straps carried thereby and projecting outwardly from said junction box to engage against an adjoining support surface, a face plate closing said flanged front opening and having means forming a plurality of mounting openings and a cluster of lighting units thereon carried in said mounting openings.

3. A cluster box having a face plate accommodating plural light units in flush mounting on a masonry wall comprising, an entrance box having top, bottom, side and rear walls, and an open front side, each wall of said entrance box being formed with knock-out openings adapted to receive a conduit run, a junction box having a dimensional size equal to a standard brick and having a rear wall connected in firm assembly with said entrance box at said open front side, said junction box having a flanged front opening adapted to be positioned in flush relationship to the surface of a wall into which said junction box may be mounted, and a face plate connected to said junction box and closing said flanged front opening, said face plate having forwardly projecting hollow boss means forming a wiring compartment, said boss means having a plurality of mounting openings extending therethrough, and a cluster of light units connected to said boss means in said mounting openings in operative communication with said wiring compartment.

4. A cluster box accommodating plural light units in flush mounting on a wall comprising, an entrance box having top, bottom, side and rear walls and an open front side, each wall of said entrance box being formed with knock-out openings adapted to receive a conduit run, a junction box having a dimensional size equal to a standard brick and having a rear wall connected in firm assembly to said entrance box at said open front side and a flanged front opening adapted to be positioned in flush relationship to the surface of a wall into which it may be mounted, and a face plate closing said flanged front opening and having forwardly projecting hollow boss means forming a wiring compartment, said boss means having a plurality of tapped openings extending therethrough for attaching light units thereon in operative communication with said wiring compartment, said boss means formed to provide an opening on the bottom side thereof, and an access cover removably connected to said bottom side to afford selective access to said wiring compartment.

5. A junction box for recessed wall installation comprising a box-like member having a dimensional size equal to a standard brick and including a flanged front opening and top, bottom and side walls and a rear wall formed with a rear entrance opening, and a face plate connected to and covering said flanged front opening and adapted to be disposed in flush relation to a wall in which the box is mounted, said face plate having forwardly projecting hollow boss means forming a wiring compartment, said boss means having a plurality of mounting openings extending therethrough, and a cluster of light units, including a separate light unit connected to each of said mounting openings in operative communication with said wiring compartment.

6. A junction box as defined in claim 5, said boss means having an arcuate front wall with substantially parallel upper and lower walls, said mounting openings being formed in said arcuate front wall.

7. A wall mounting means for lighting units comprising a plate member adapted to be carried on a wall surface and comprising hollow boss means forming a wiring compartment and having an arcuate front wall with substantially parallel upper and lower walls, and means forming a plurality of spaced apart openings in said arcuate front wall for carrying a corresponding plurality of light units, said lower wall comprising a removable access cover, and fastening means to attach said access cover in removable assembly with said boss means, thereby affording selective access to said wiring compartment.

8. Mounting means for light units comprising an entrance box, a junction box connected to one side of said entrance box, and a face plate removably fastened to said junction box and having means formed therein comprising a wiring compartment having upper and lower walls and an arcuate front wall extending therebetween, said arcuate front wall having a plurality of light units mounted thereon, said lower wall of said wiring compartment comprising a removable access cover for affording selective access to said wiring compartment.

9. Mounting means for light units comprising an entrance box having one side open, a junction box connected to said one side of said entrance box, said junction box having top, bottom and side walls disposed in rectangular configuration and forming a box having a front opening, and a face plate removably fastened to said junction box over said front opening and having means formed therein comprising a wiring compartment having upper and lower walls and an arcuate front wall extending therebetween, said arcuate front wall having a plurality of light units mounted thereon, a rear wall in said junction box having a rearwardly projecting portion of reduced size intermediately thereof, and an anchor strap connected to said rear wall on each side of said projecting portion, each anchor strap having first and second portions projecting towards the top and bottom walls of the junction box, respectively, and each anchor strap being offset to overlie an adjoining wall of said junction box in angularly spaced relation, thereby to assist in supporting the junction box.

10. A junction box as defined in claim 9, said junction box being formed to the same size as a brick and said anchor straps having their free ends spaced away from the adjoining top and bottom walls of said junction box a distance corresponding to the thickness of a layer of mortar between the bricks of a wall, thereby to engage and support against the adjoining surface of an adjacent brick when said junction box is inserted in a wall.

11. For use in a wall construction comprising a plurality of bricks having layers of mortar therebetween and together forming a wall having substantially parallel spaced apart front and rear surfaces, the improvement of a junction box for insertion into the wall sized and shaped to correspond to a brick and having a flanged front opening including a front surface adapted to be flush with the front surface of the wall and having a projecting portion extending rearwardly, a face plate connected to said flanged front opening and adapted to overlie the front surface of the wall, and an entrance box projecting rearwardly of and being connected to said projecting portion, said face plate having a portion projecting forwardly of said front surface and forming a wiring compartment having top and bottom walls and a front wall provided with a plurality of spaced apart mounting openings for receiving a cluster of light units.

12. A junction box as defined in claim 5, said boss means being formed to provide an opening on the bottom side thereof, and an access cover removably connected to said bottom side to afford selected access to said wiring compartment.

References Cited in the file of this patent
UNITED STATES PATENTS

| | | |
|---|---|---|
| 337,693 | Mitchell | Mar. 9, 1886 |
| 765,904 | Richardson | July 26, 1904 |
| 851,598 | LaPaugh | Apr. 23, 1907 |
| 851,726 | Adam | Apr. 30, 1907 |
| 883,777 | Benjamin | Apr. 7, 1908 |
| 1,400,296 | Kusel | Dec. 13, 1921 |
| 1,404,733 | Benjamin | Jan. 31, 1922 |
| 1,709,202 | Boldin | Apr. 16, 1929 |
| 1,875,101 | Morrell | Aug. 30, 1932 |
| 1,895,791 | Garford | Jan. 31, 1933 |
| 1,972,794 | Reese | Sept. 4, 1934 |
| 2,048,611 | Kranz | July 21, 1936 |
| 2,259,089 | Sipp et al. | Oct. 14, 1941 |
| 2,385,620 | Fleckenstein | Sept. 25, 1945 |
| 2,562,063 | Rutledge | July 24, 1951 |
| 2,562,064 | Rutledge | July 24, 1951 |

FOREIGN PATENTS

| | | |
|---|---|---|
| 453,006 | Great Britain | Sept. 3, 1936 |
| 487,122 | Great Britain | June 15, 1938 |

OTHER REFERENCES

Electrical Contracting, page 31, vol. 35, No. 3, January 1936.
Electrical Contracting, page 11, vol. 35, No. 5, March 1936.
Electrical Contracting, page 56, vol. 37, No. 12, December 1938.
Electrical Contracting, page 72, vol. 38, No. 6, June 1939.
Electrical Construction and Maintenance, page 54, vol. 50, No. 1, January 1951.